US011945646B2

(12) United States Patent
McDonald

(10) Patent No.: US 11,945,646 B2
(45) Date of Patent: Apr. 2, 2024

(54) TRASH BAG DISPENSING TRASH RECEPTACLE

(71) Applicant: Amber Marie McDonald, Leominster, MA (US)

(72) Inventor: Amber Marie McDonald, Leominster, MA (US)

( * ) Notice: Subject to any disclaimer, the term of this patent is extended or adjusted under 35 U.S.C. 154(b) by 0 days.

(21) Appl. No.: 17/872,727

(22) Filed: Jul. 25, 2022

(65) Prior Publication Data

US 2023/0022368 A1 Jan. 26, 2023

Related U.S. Application Data

(60) Provisional application No. 63/225,696, filed on Jul. 26, 2021.

(51) Int. Cl.

*B65F 1/06* (2006.01)
*B65F 1/08* (2006.01)
*B65F 1/16* (2006.01)

(52) U.S. Cl.

CPC ................ *B65F 1/062* (2013.01); *B65F 1/08* (2013.01); *B65F 1/163* (2013.01); *B65F 1/1646* (2013.01)

(58) Field of Classification Search

CPC .. B65F 1/062; B65F 1/08; B65F 1/163; B65F 1/1646; B65F 1/0006; B65F 1/1623
USPC ... 220/495.06, 495.07, 908, 908.1, 263, 264
See application file for complete search history.

(56) References Cited

U.S. PATENT DOCUMENTS

| | | | |
|---|---|---|---|
| 4,850,507 A | 7/1989 | Lemongelli et al. | |
| 5,458,259 A | 10/1995 | Falk | |
| 6,126,031 A | 10/2000 | Reason | |
| 7,168,591 B1 | 1/2007 | Miller | |
| 7,422,126 B2 | 9/2008 | Ceschi | |
| 8,317,055 B2 | 11/2012 | Zawrotny et al. | |
| 8,807,379 B1 | 8/2014 | Hammond | |
| D739,109 S | 9/2015 | Becham et al. | |
| 9,771,215 B2 | 9/2017 | Rogers | |
| 9,850,064 B2 | 12/2017 | Egan et al. | |
| 10,059,514 B2 | 8/2018 | Bowen et al. | |
| 10,450,133 B2 | 10/2019 | Chen | |
| 2008/0083757 A1 | 4/2008 | Parker et al. | |
| 2010/0084235 A1* | 4/2010 | Lu | B65F 1/163 188/280 |
| 2010/0219191 A1* | 9/2010 | Prosa | B65F 1/1436 220/252 |
| 2010/0276428 A1 | 11/2010 | Lord et al. | |
| 2011/0284549 A1 | 11/2011 | James et al. | |
| 2012/0261284 A1 | 10/2012 | Thurmond | |

(Continued)

*Primary Examiner* — John K Fristoe, Jr.
*Assistant Examiner* — Elizabeth J Volz
(74) *Attorney, Agent, or Firm* — Bold IP, PLLC; Binita Singh

(57) ABSTRACT

The present invention is an improved trash receptacle comprising a frame which houses an inner bin. The inner bin has an open bottom covered by a storage tray and a bin tray that can slide out from an opening in a front of the trash receptacle for ease of cleaning. The storage tray stores replacement trash bags that can be pulled out of an opening in a center of the bin tray. The bin tray has raised edges as well as the opening which has a raised lip encircling the opening, which prevents any spillage from a trash bag lining the inner bin to spill into the storage container. The trash receptacle also comprises a halo lid which seals a top of the trash bag lining the inner bin to prevent slipping of the liner.

24 Claims, 9 Drawing Sheets

(56) References Cited

U.S. PATENT DOCUMENTS

| | | | | |
|---|---|---|---|---|
| 2013/0098913 | A1* | 4/2013 | Yang | B65F 1/08 220/263 |
| 2015/0239663 | A1* | 8/2015 | Diep | B65D 33/002 220/495.07 |
| 2015/0251849 | A1 | 9/2015 | Yang et al. | |
| 2015/0321841 | A1* | 11/2015 | Salas | B65F 1/067 220/495.07 |
| 2021/0253343 | A1* | 8/2021 | Downing | B65F 1/06 |

* cited by examiner

TRASH BAG DISPENSING TRASH RECEPTACLE

CROSS-REFERENCE TO RELATED APPLICATIONS

This application is a non-provisional application which claims priority to U.S. Provisional Patent Application No. 63/225,696 filed on Jul. 26, 2021, which is incorporated by reference in its entirety.

FIELD OF DISCLOSURE

The overall field of this invention generally pertains to trash receptacles, and more specifically to a trash receptacle with a bag dispensing compartment.

BACKGROUND

Trash cans or trash receptacles provide a solution to collecting waste. Trash cans are found in a lot of places such as in a home, office, commercial establishment, street, and others. Trash receptacles can be almost any size, shape, or color ranging from a small plastic wastepaper basket to a much larger outdoor metal container. Some trash receptacles will typically be lined with a trash bag to collect waste deposited in the trash receptacle. Utilizing the trash bags to line trash receptacles keeps trash contained, eases the removal of trash, and also prevents the insides of trash receptacles from being coated in waste material.

Generally, in a typical home, the trash bags to line a trash receptacle are stored away from the trash receptacle in a cabinet or drawer. Once the used trash bag has been removed from the trash receptacle, a new bag will be retrieved to line the trash receptacle. This may require moving to the separate location to retrieve the bag and in some cases searching for the trash bags. Often times, a user may have used the last bag and not have a new bag to line the trash can. Another frustrating task can be that when placing a new trash bag through the top opening of the receptacle, the bag often tends to cling to the sides of the receptacle and makes the task of lining the receptacle a little more difficult and time consuming.

There are other frustrating issues that are presented with liners placed within trash receptacles. The liners often start to slide down from the top end when trash is added as the weight tends to pull on the liner. The top end of the trash liner may be placed over the top edge of the trash receptacle, but that can be unsightly. Another issue that may be encountered is that the trash liner may tear and spill into the trash receptacle which makes the task of cleaning the trash receptacle tedious and time consuming.

Accordingly, there exists a need for a trash receptacle that address the above issues and others.

SUMMARY

One or more embodiments are provided below of an improved trash receptacle adapted to dispense trash bags for replacement and for sealing a top of the trash bag to prevent slipping of the trash bag. The trash receptacle may include a frame configured to house an inner bin. The frame has a rim and side walls, wherein the side walls comprise of a front right wall, a front left wall, and a back wall. The rim is covered by a lid that is pivotally connected to a top of the rim. A base is configured and connected to an end opposite the lid wherein the base is configured to house a foot pedal. A storage tray and a bin tray covering a top of the storage tray are slidingly provided in the frame above the base. The foot pedal is connected to a lid opening mechanism at a rear of the base. The lid opening mechanism extends upward to connect to the lid, whereby a downward pressure on the foot pedal moves the lid opening mechanism upward to push up the lid which pivots at the connection with the rim to open.

In the one or more embodiments, the foot pedal is also connected to a lid closing mechanism which ensures that the lid closes slowly without slamming down onto the rim. The lid closing mechanism is housed in the base, wherein the lid closing mechanism utilizes a chamber with air that becomes pressurized as a downward pressure is applied on the foot pedal and wherein air is replaced back into the chamber once the pressure is removed from the foot pedal. The air is replaced slowly whereby the lid closing mechanism slows the movement of the foot pedal which in turn slows the movement of the lid downward to close.

The inner bin housed within the frame has downward extending walls which has an open top and an open bottom, wherein the open bottom abuts against the bin tray covering the storage tray when housed within the frame. The bin tray provides a floor for the inner bin, wherein the bin tray closes the open bottom. The bin tray and the storage tray are removable from within the frame for ease of cleaning in case of a spillage and also to replace a cartridge or roll of bags in the storage tray. The bin tray has an opening in a center to access a replacement bag to line the inner bin. The opening is covered by a pliable material with one or more slits to add friction to the movement of removing bags. Another bag connected to the replacement bag is held in the opening ready to be pulled through when needed.

Additionally, the improved trash receptacle also includes a halo lid which is similar to a band that is configured to rest on a top edge of the inner bin. The halo lid is pivotally connected to the rim and can be manually moved up and down. The halo lid seals a top of a trash bag lining the inner bin ensuring that the trash bag does not slip.

Accordingly, it is an object of the present disclosure to provide an improved and effective means of retrieving a trash bag to line a trash receptacle. Additionally, it is also the object of the present disclosure to provide an effective means of lining the trash receptacle with a top of the bag held. Other aspects and advantages of the present disclosure will become apparent upon consideration of the following description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
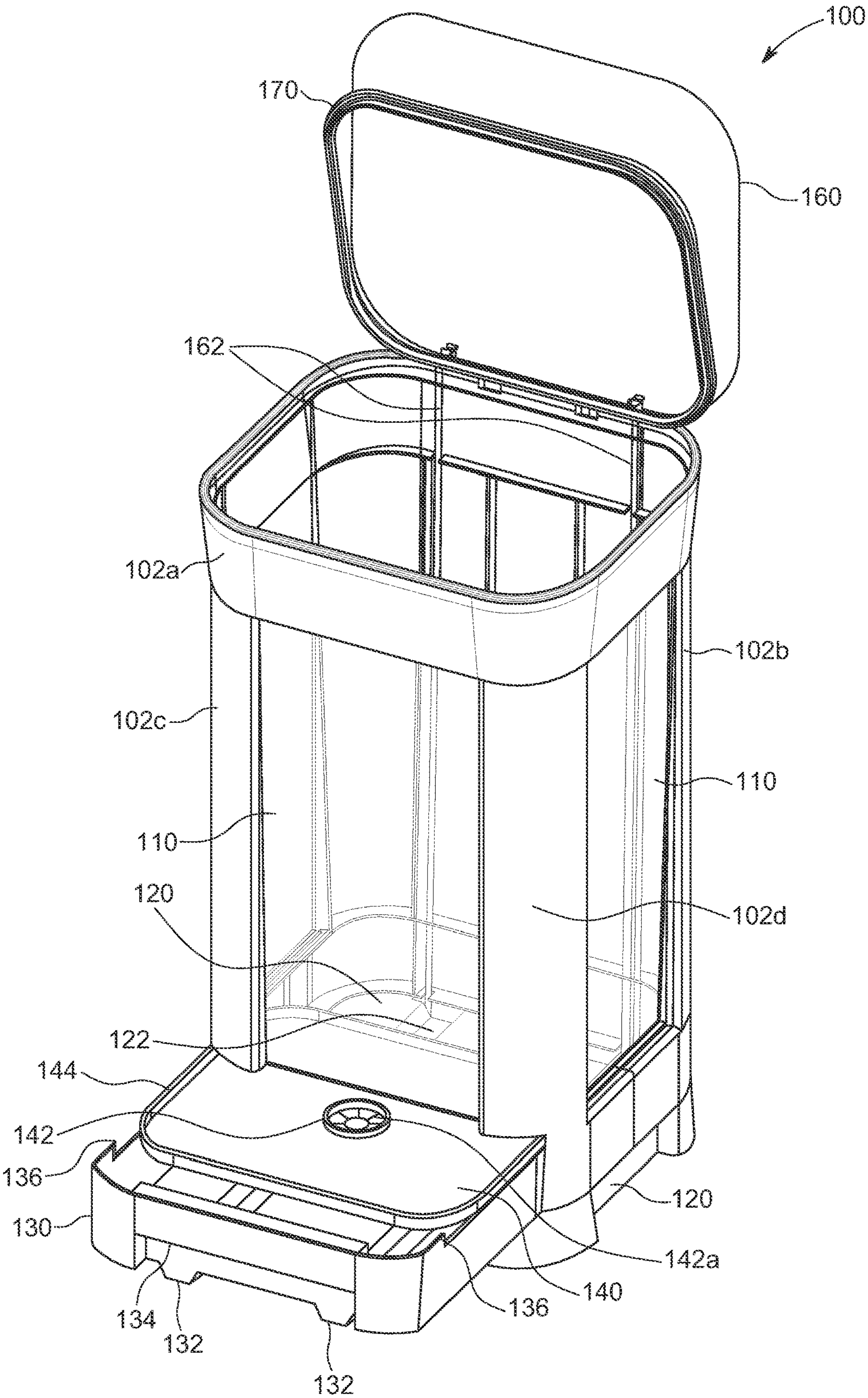
FIG. 1 is a pictorial illustration of a trash receptacle with a transparent view of an inside of the trash receptacle in accordance with an illustrative embodiment.

In the Summary above and in this Detailed Description, and the claims below, and in the accompanying drawings, reference may be made to particular features of the invention. It may be understood that the disclosure of the invention in this specification includes all possible combinations of such particular features. For example, where a particular feature may be disclosed in the context of a particular aspect or embodiment of the invention, or a particular claim, that feature can also be used, to the extent possible, in combination with and/or in the context of other particular aspects and embodiments of the invention, and in the invention generally.

Where reference may be made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" may be used herein to mean "serving as an example, instance, or illustration." Any aspect described in this document as "exemplary" may not be necessarily to be construed as preferred or advantageous over other aspects.

Throughout the drawings, like reference characters are used to designate like elements. As used herein, the terms "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

The present disclosure recognizes the unsolved need for an improved, economical, simple, and effective means of replacing and lining a trash receptacle with a trash bag. The present disclosure also recognizes the need to provide an improved means to prevent slipping of the trash bag when the trash receptacle is lined with the trash bag.

Non-limiting embodiments of the present disclosure generally pertain to a trash receptacle that has a sealed off compartment to be utilized for storing replacement trash bags. The sealed off compartment preferably accepts a removable drawer within which the replacement trash bags are stored and provide convenience for a user to readily access the replacement trash bags once a used trash bag is removed from the trash receptacle. Additionally, the present disclosure also provides a trash receptacle that utilizes a halo lid in the shape of the trash receptacle that fits relatively snugly within a top opening of the trash receptacle to securely hold a top portion of a trash bag lining the trash receptacle to prevent the trash bag from slipping. The trash receptacle of the present disclosure may be of any suitable size, shape, and material.

Figure 2:
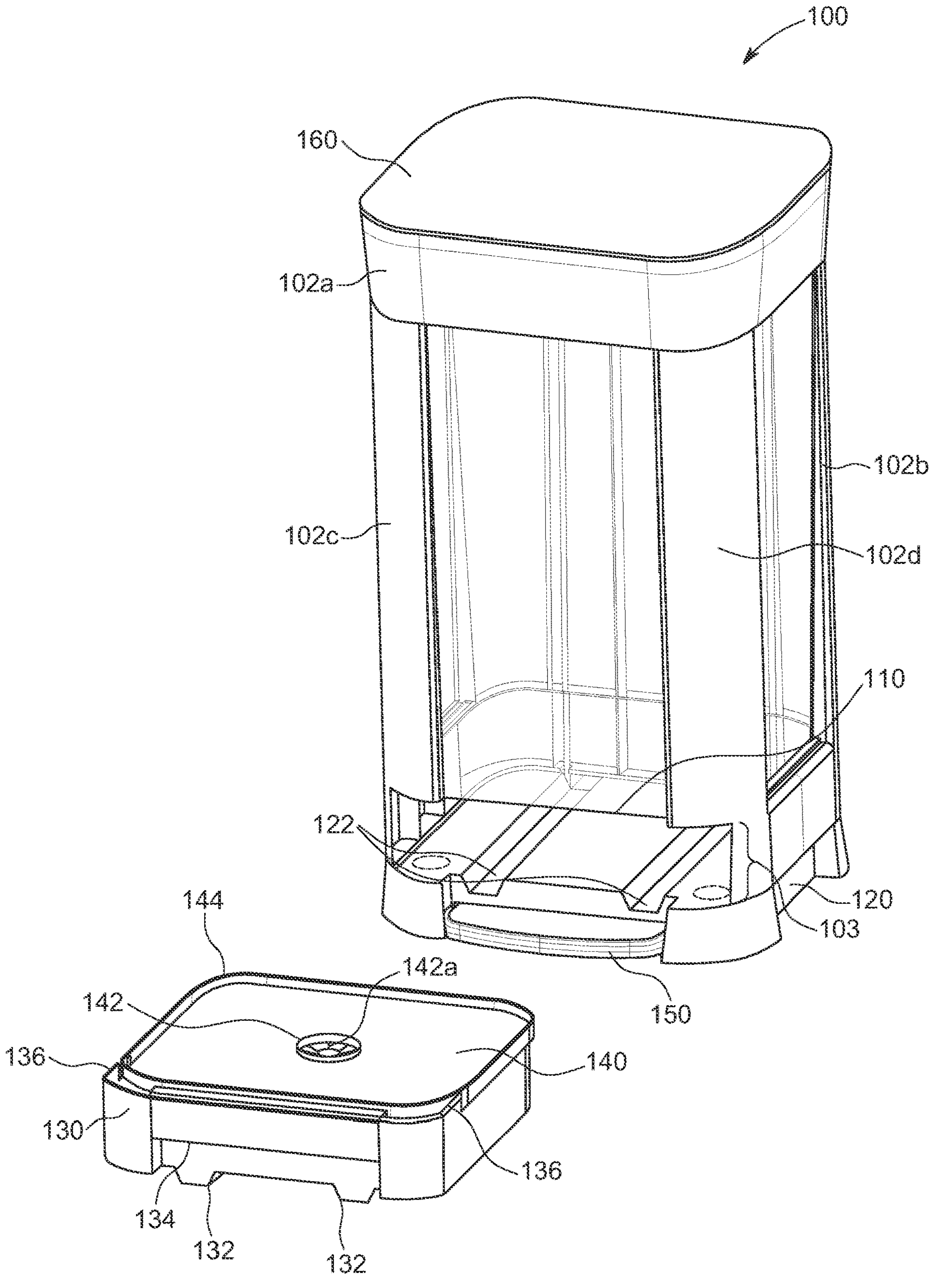
FIG. 2. is a pictorial illustration of the trash receptacle with a storage bin and a tray bin removed from within a base in accordance with an illustrative embodiment
Figure 3:
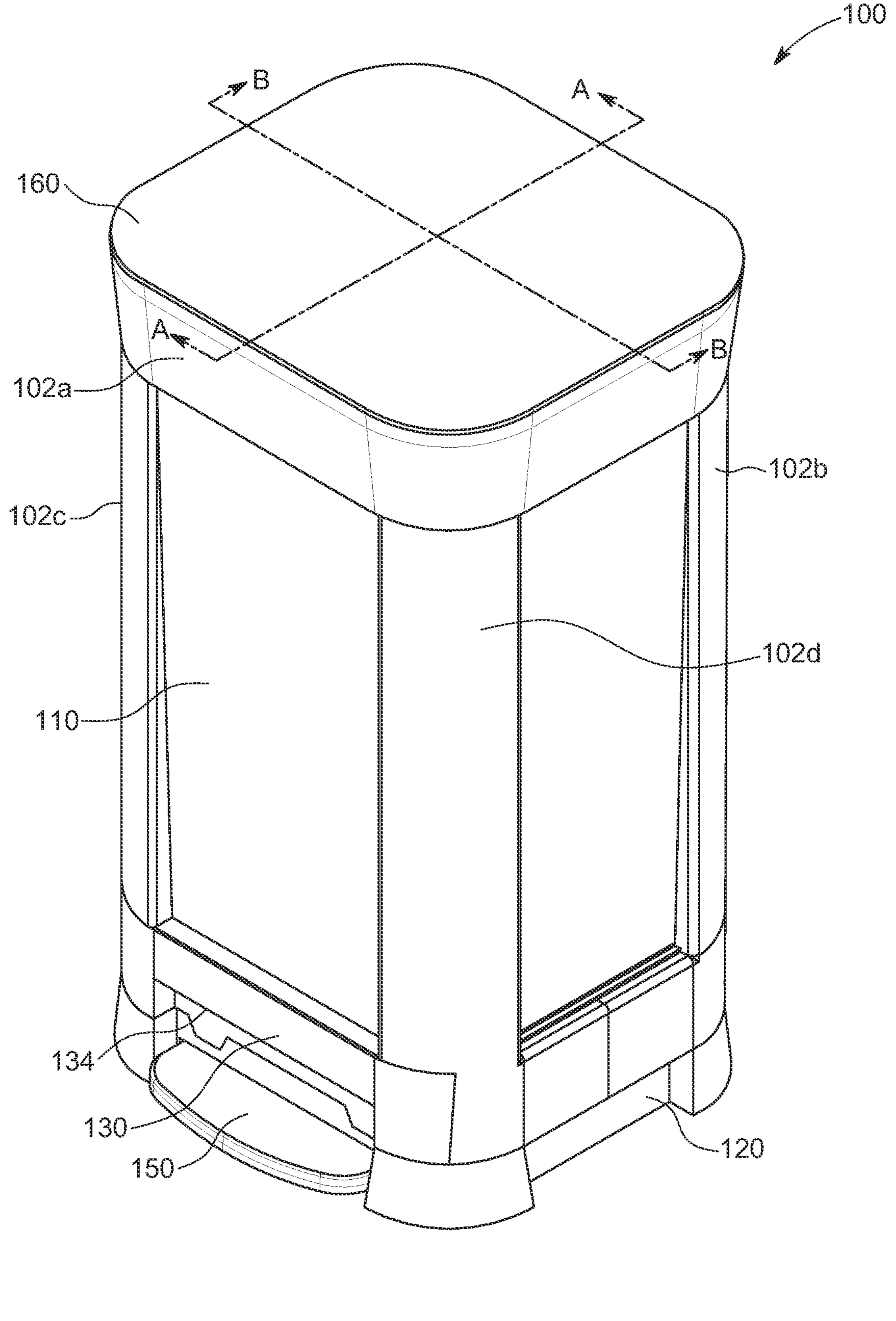
FIG. 3 is a pictorial illustration of the trash receptacle in accordance with an illustrative embodiment.

Referring to the figures, a non-limiting embodiment of a trash receptacle is described and shown in FIGS. 1 and 2, such as trash receptacle 100. The trash receptacle 100 includes a frame 102, an inner bin 110, a base 120, a storage tray 130, a bin tray 140, a foot pedal 150, a lid 160, and a halo lid 170. In FIG. 1, the inner bin 110 is shown as transparent, however this is done strictly for purposes of showing an inside of the inner bin 110. The frame 102 defines part of an outer structure of the trash receptacle 100 and provides a housing for the inner bin 110. Additionally, the frame 102 is connected to the base 120. The base 120 also provides part of the outer structure and houses the foot pedal 150, a connected mechanism to open the lid 160, and a lid closing mechanism. The inner bin 110 is provided for trash collection which is lined with a garbage bag. The storage tray 130 and the bin tray 140 are configured to fit within the trash receptacle 100 below the inner bin 110 and above the base 120. The bin tray 140 is separate from the inner bin 110 and it provides a floor for the inner bin 110. The storage tray 130 is separate from the bin tray 140 and the bin tray 140 provides a cover for the storage tray 130. Additionally, the bin tray 140 separates the storage tray 130 from the inner bin 110 and a liner with trash. The storage tray 130 accommodates a box or roll of garbage bags that can be pulled through an opening 142 in the bin tray 140 to line the inner bin 110 with a garbage bag. While the trash receptacle 100 is depicted as having a rectangular shape, it shall be appreciated that any alternative shape and size is within this disclosure.

The frame 102 provides a housing and a support structure for the inner bin 110. An example of the frame 102 is shown in FIG. 1, wherein the frame 102 may be an open cavity frame defined by a rim 102*a* at a top and side walls including a back wall 102*b*, a front left wall 102*c*, and a front right wall 102*d*. The back wall 102*c*, the front left wall 102*c*, and the right front wall 102*d* are connected to the rim 102*a* and the base 120 to provide structural support. In this non-limiting embodiment, the inner bin 110 is not fully covered and visible between the front left wall 102*c* and the front right wall 102*d*, and also between both the back wall 102*b* and the front left wall 102*c*, and the back wall 102*b* and the right front wall 102*d*. In alternate embodiments, the frame 102 fully covers the inner bin 110. Thus, the frame may include a closed cavity frame wherein the side walls fully enclose the inner bin 110 and the side walls are connected to the rim of the frame and the base of the frame. A front of the frame 102 has an opening 103 configured for the storage tray 130 and the bin tray 140 to slide into and out of the trash receptacle (discussed below).

Figure 4:
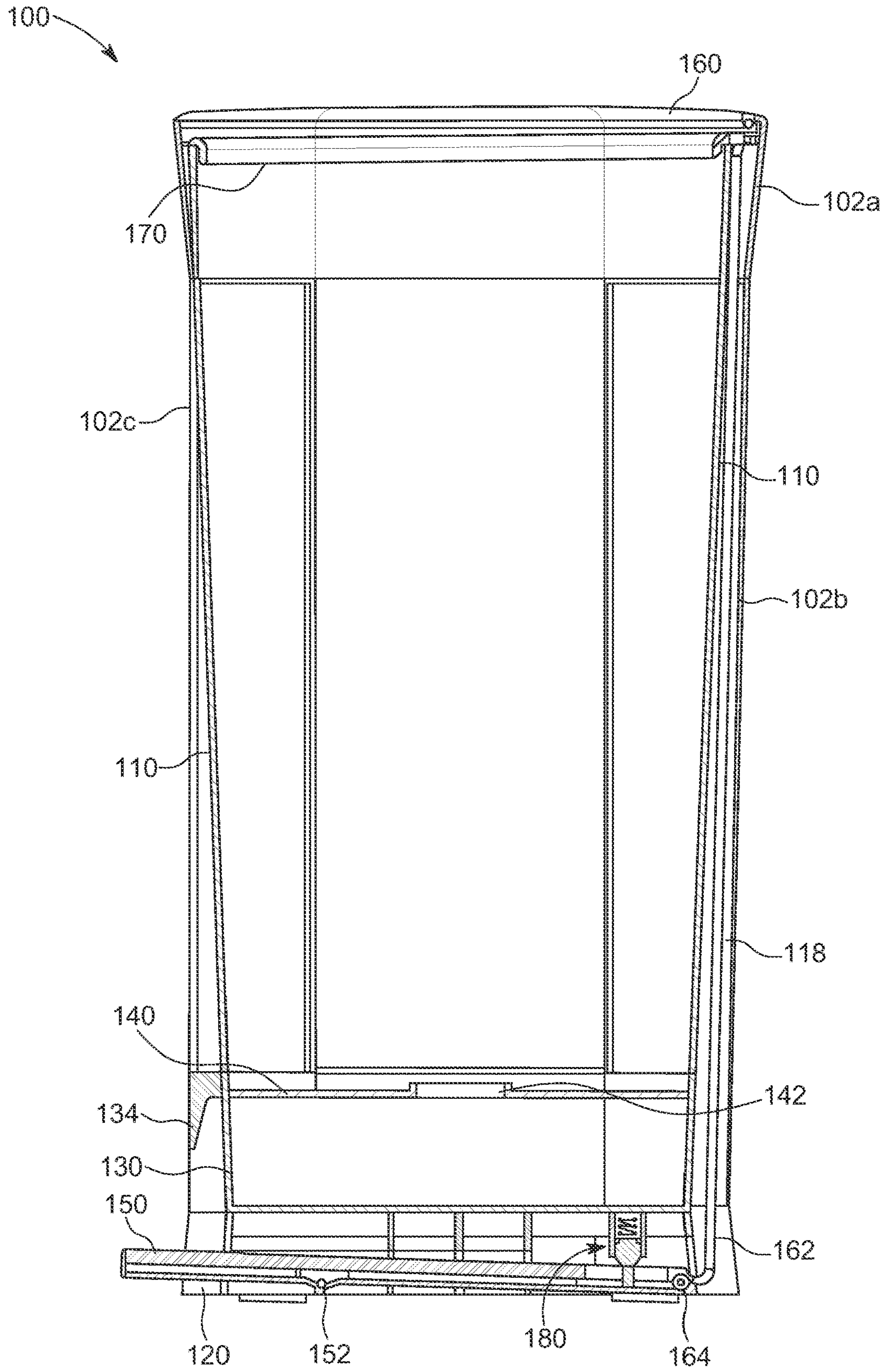
FIG. 4 is a pictorial illustration of a cross-sectional view of the trash receptacle taken along line A-A of the trash receptacle in FIG. 3.
Figure 5:
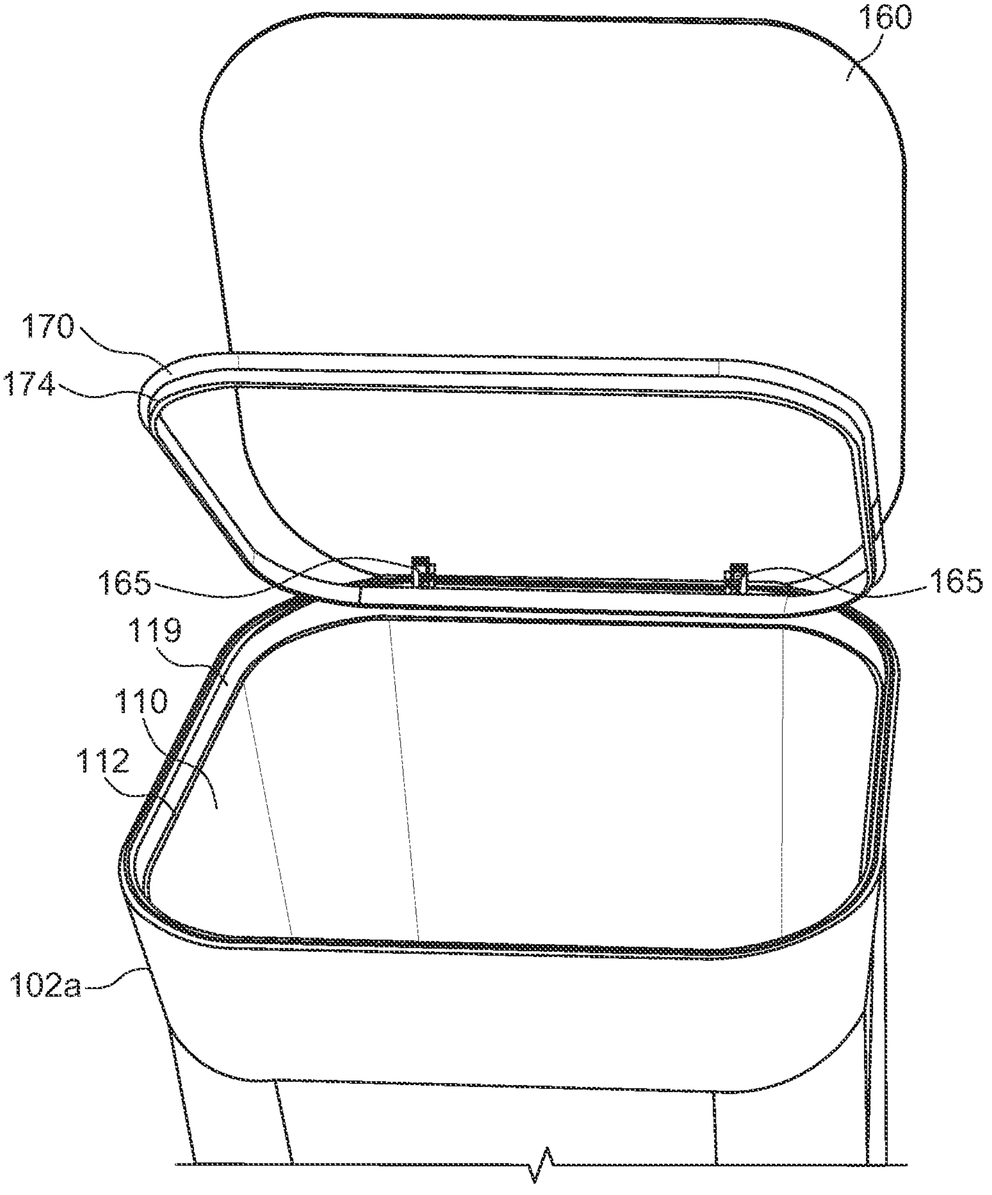
FIG. 5 is a pictorial illustration of close-up view of a top of the trash receptacle in accordance with an illustrative embodiment.
Figure 6:
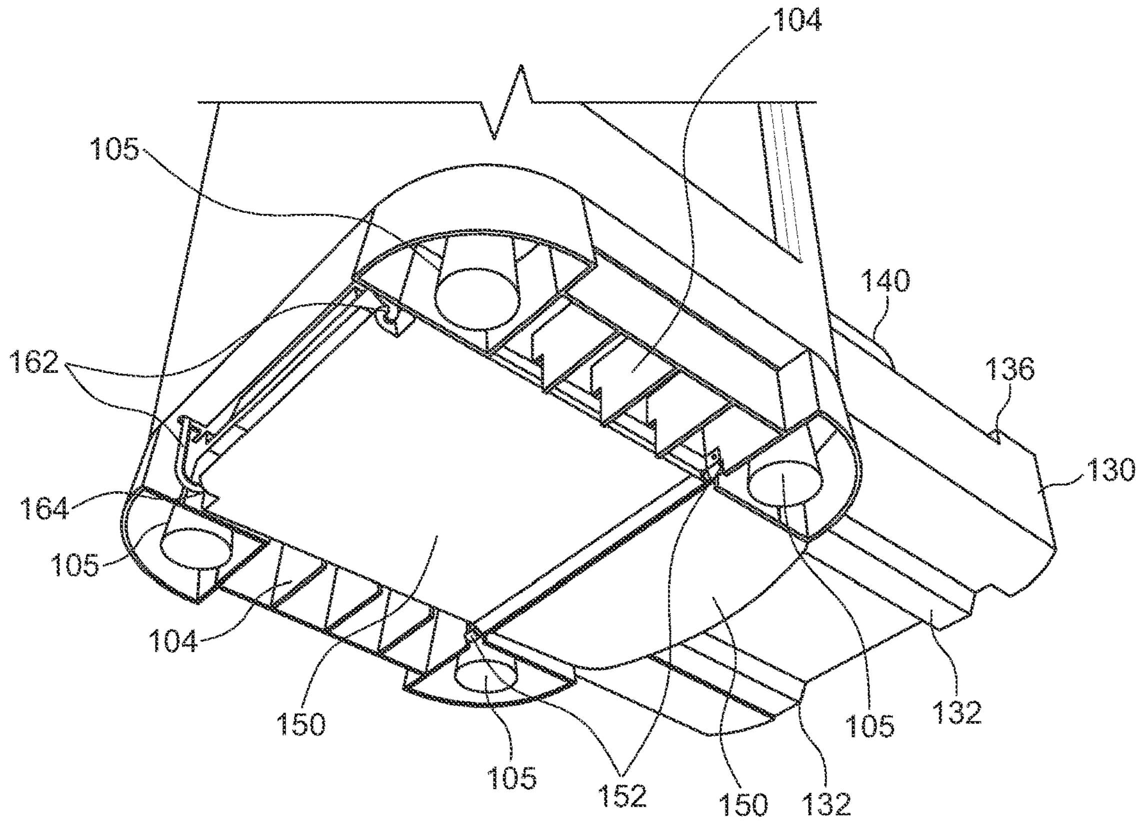
FIG. 6 is a pictorial illustration of a bottom view of the trash receptacle in accordance with an illustrative embodiment.

As best seen in FIG. 2, the base 120 is wider with the back wall 102*b*, the front left wall 102*c*, and the front right wall 102*d* narrowing as they move toward the rim 102*a*. The wider base 120 provides stability to the overall structure of the trash receptacle 100. The rim 102*a* may also widen moving toward a top end toward the lid 160 to allow easy access to the inner bin 110. The rim 102*a* defines a top frame edge and forms a complete band around to provide reinforcement and hold together the entire frame 102. Additionally, the rim 102*a* also provides a surface for the lid 160 to rest on in a closed position. The rim 102*a* also encircles a top of the inner bin 110 placed within the frame 102. The base 120 houses the foot pedal 140, as seen in FIG. 4, which is a bottom view of the trash receptacle 100. FIG. 6 depicts that the base 120 includes one or more feet 105, which may be a rubber material or other grippy material. The one or more feet 105 prevent sliding of the trash receptacle 100. Additionally, the bottom of the base 120 also includes ribs 104 to provide stability and compression strength.

The inner bin 110 is configured to fit within the frame 102. The inner bin 110 has a shape corresponding to the overall shape defined by the frame 102. The inner bin 110 has walls that extend downward toward the base 120 and do not extend past the opening 103 in the frame 102. The inner bin 110 has an open top and an open bottom. The storage tray 130 and the bin tray 140 form a closed bottom for the inner bin 110 when the trays 130, 140 are inserted into the opening 103. A hollow space 118 exists between an entire length of the frame's back wall 102*b* and the inner bin 110. Additionally, a top edge 112 of the inner bin 110 is spaced apart from the frame's top 102 to create a gap 119. This gap 119 allows for a top of a trash bag to fit around inner bin 110 and not be visible from an outside of the trash receptacle 100. The inner bin 110 is attached to the frame 102 and is not removable. In alternate embodiments, the inner bin 110 is not attached to the frame 102 and is removable for ease of cleaning.

Referring to FIGS. 1, 2, and 6, the storage tray 130 and the bin tray 140 are housed in a space just above the base 120 and below the inner bin 110. The storage tray 130 has upstanding side walls that fit through the opening 103 to form a cavity to hold surplus trash bags. The bin tray 140 has a shape that conforms to a shape of the base 120 and is configured to fit on top of the storage tray 130. The storage tray 130 and the bin tray 140 on top are configured to fit in a close-fitting manner within the base 120. The storage tray 130 is removable such that it can be pulled out to replace a box or roll of trash bags. More particularly, the storage tray 130 can slide out from the opening 103 and then be returned by sliding back through the opening 103 to be housed within the frame 102. The storage tray 130 can slide out entirely and removed from within the opening 103 in the frame 102. In one or more non-limiting embodiments, a bottom surface of the storage tray 130 includes one or more grooves 132 which are configured to engage with one or more tracks 122 on a top surface of the base 120. Thus, the one or more grooves 132 align with the one or more tracks 122 allowing the storage tray 130 to slide in and out of the opening 103 in the frame 102. The storage tray 130 includes a handgrip 134 on a front of the storage tray 130 allowing a user to control the sliding movement of the storage tray 130. In this non-limiting embodiment, the handgrip 134 is configured on a front edge of the storage tray 130 as a lip for a user to place the fingers under the lip and pull out the storage tray 130. It is to be understood that alternate structural or mechanical features can be used as a means for sliding the storage tray 130 into and out of the base 120.

Figure 12:
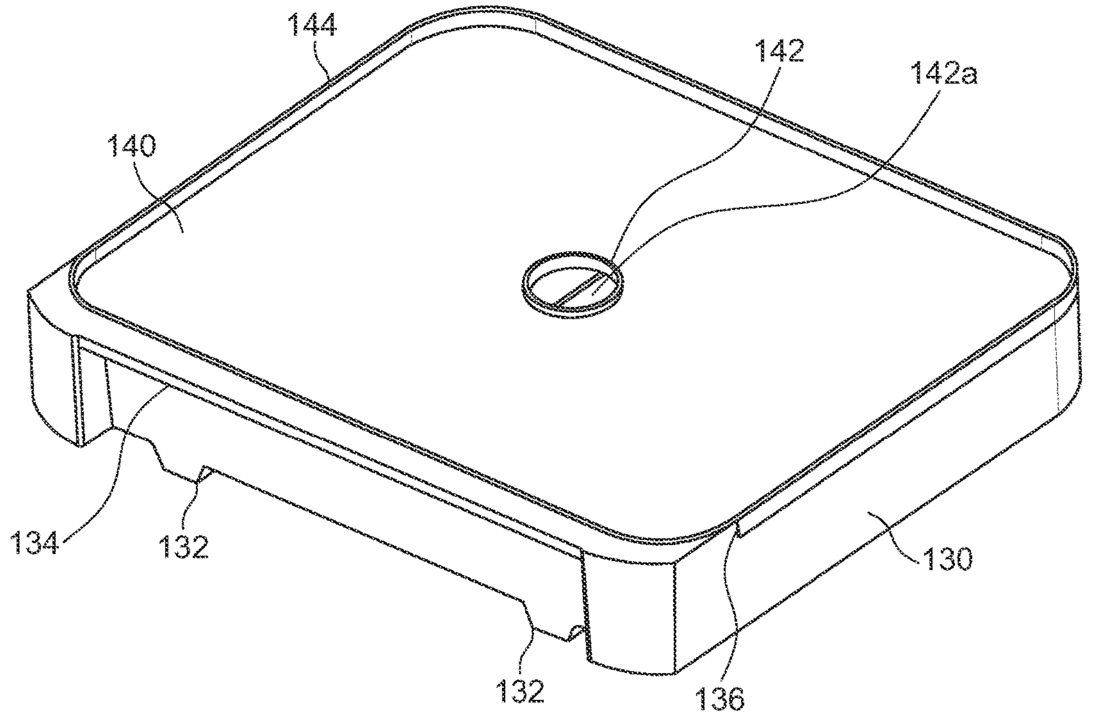
FIG. 12 is a pictorial illustration of a storage tray and a bin tray of the trash receptacle in accordance with an illustrative embodiment.

As seen in FIG. 1, the storage tray 130 is covered with a bin tray 140 which separates the storage tray 130 from the inner bin 110 within the frame 102. In other words, the bin tray 140 provides the floor for the inner bin 110 and thus closes the open bottom end of the inner bin 110. The bin tray 140 has at least two functions, which includes separating the storage tray 130 from the inner bin 110 and serves to prevent any spillage out of the bin tray 140 from a leaking garbage bag lining the inner bin 110. FIG. 2 and FIG. 12 also illustrates the storage tray 130 and the bin tray 140 pulled out of the opening 103 The bin tray 140 fits onto the storage tray 130 and is capable of being pulled out of the opening 103 along with the storage tray 130. The bin tray 140 can remain within the opening 103 and below the inner bin 110 as the storage tray 130 is pulled out only. The bin tray 140 cannot slide out from within the opening 103 until the storage tray 130 is pulled out too. The storage tray 130 has a lip 136 on each of a right side wall and a left side wall which prevents the bin tray 140 from sliding out on its own.

The bin tray 140 includes the opening 142 relatively in a center of the bin tray 140 through which a replacement bag may be pulled through to line the inner bin 110 for trash collection. The opening 142 has a raised lip around the entire opening to prevent any leakage into the storage bin 130 in case of a spillage from a liner. Further, the opening 142 is covered with a pliable material with one or more slits 142*a* to provide some friction for when pulling out the bags and to prevent debris from falling into the storage bin 130. An example of the pliable material may include and not be limited to silicone. The bin tray 140 also includes a raised lip along each edge 144 of the bin tray 140 to prevent any leakage to spill over the edge 144. As the storage tray 130 and the bin tray 140 can be pulled out of the base 120 of the trash receptacle entirely, it presents an ease of cleaning the bin tray 140 in case of any spillage.

Figure 7:
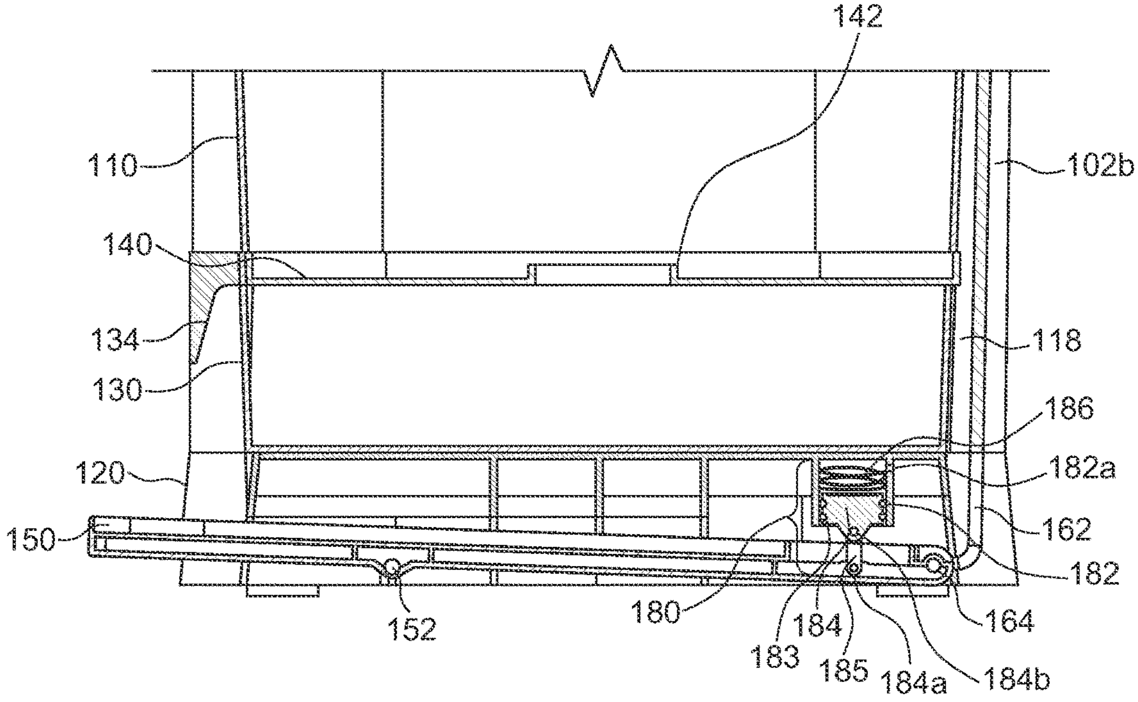
FIG. 7 is a pictorial illustration of a close-up view of a bottom portion of the trash receptacle from FIG. 4 in accordance with an illustrative embodiment.

The base 120 houses the foot pedal 150 and a close mechanism 180. FIGS. 7 to 10 illustrate the foot pedal 150, the close mechanism 180, and a lid mechanism for opening the lid 160. The foot pedal 150 works in conjunction with the lid mechanism to open the lid 160. In the embodiment shown in the figures, the lid mechanism comprises of one or more rods 162 connected to the foot pedal 150 and the lid 160. FIG. 7, illustrates a cross sectional view of the base 120 to depict the foot pedal 150. The foot pedal 150 is connected to the base 120 at a pivot point 152 and is connected to the lid mechanism (i.e., one or more rods 162) at a rear of the base 120 which is also a rear of the trash receptacle 100. The foot pedal 150 is connected to the lid mechanism by a hinge 164 that allows the lid mechanism to push upwards. The foot pedal 150 pivots at the pivot point 152 in an oscillatory motion or commonly known as a teeter totter effect, where a rear of the foot pedal 150 connected to the lid mechanism lifts upwards as a front of the foot pedal 150 moves downwards. This upward motion of the lid mechanism pushes the lid 160 open.

Figure 8:
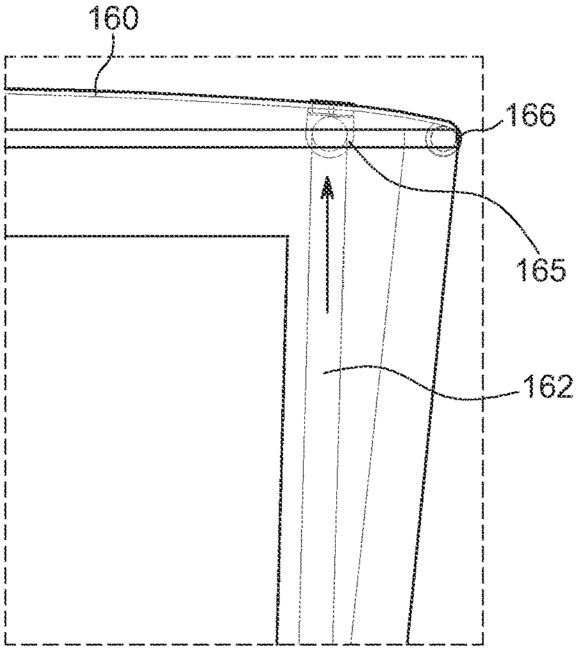
FIG. 8 is a pictorial illustration of a transparent view of a top portion depicting the part of a lid opening mechanism of the trash receptacle in accordance with an illustrative embodiment.
Figure 9:
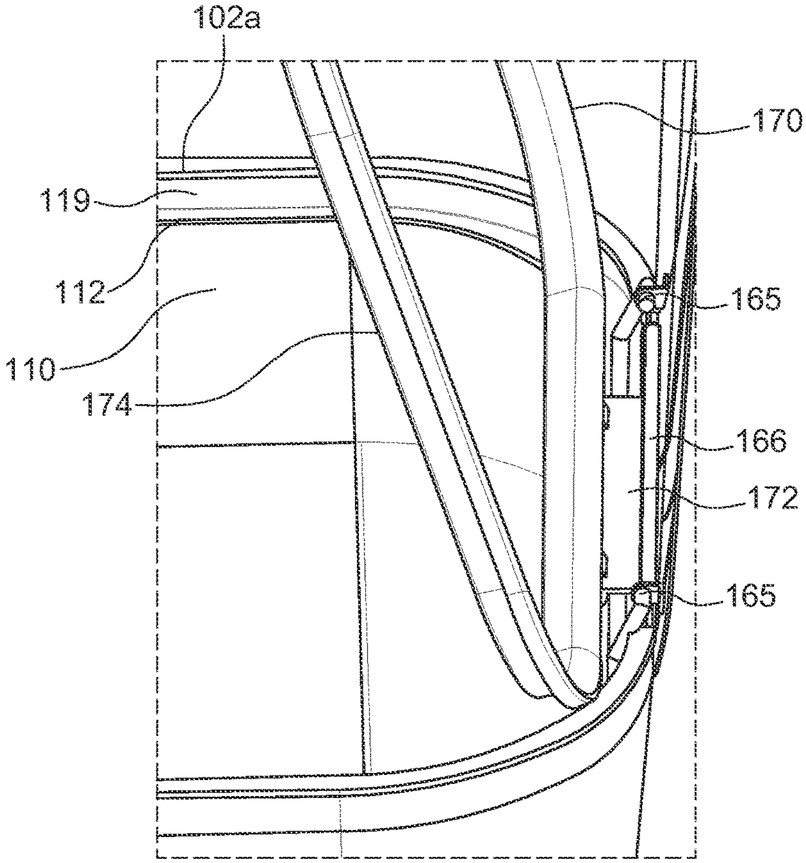
FIG. 9 is a pictorial illustration of a close-up view of a halo lid and lid pivotally connected to a rim of the trash receptacle in accordance with an illustrative embodiment.
Figure 10:
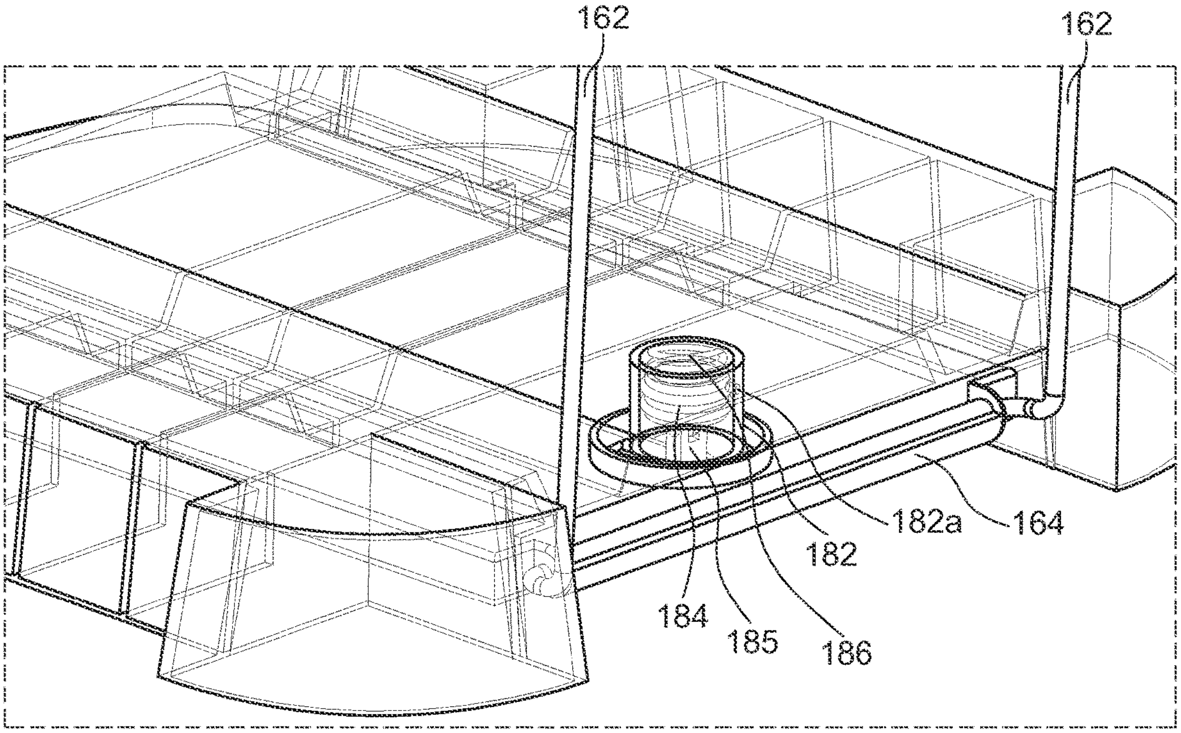
FIG. 10 is a pictorial illustration of a transparent close-up view of a base depicting a lid closing mechanism of the trash receptacle in accordance with an illustrative embodiment.
Figure 11:
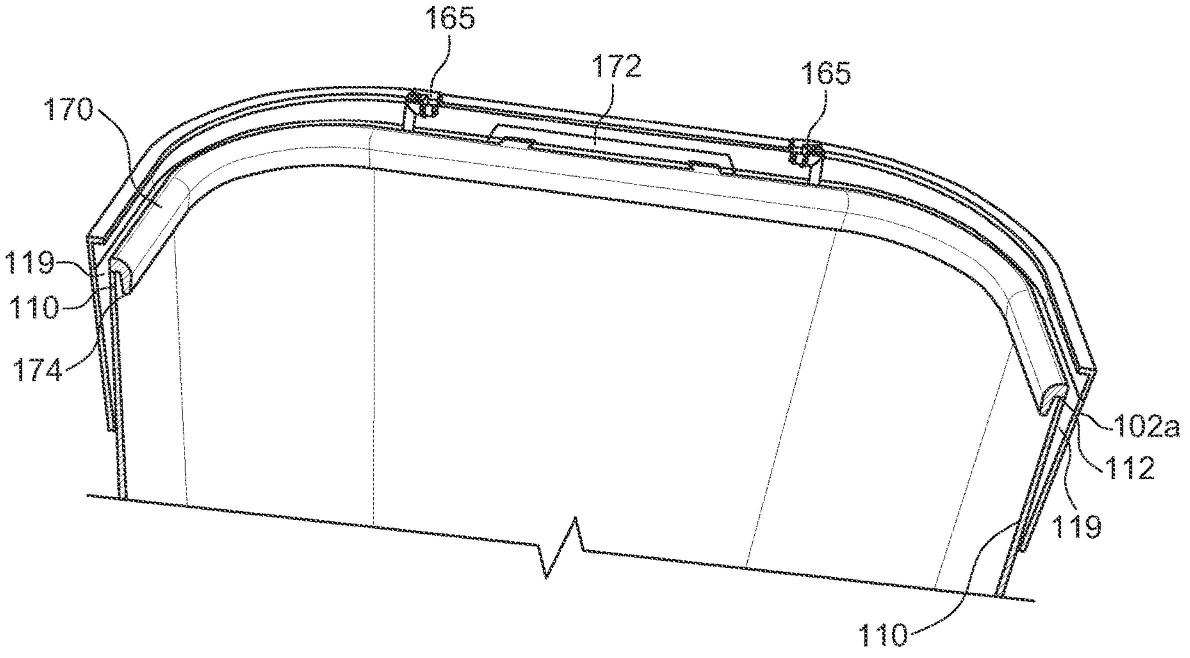
FIG. 11 is a pictorial illustration of a cross-sectional view of a top end of the trash receptacle taken along line B-B of the trash receptacle in FIG. 3

As described above, pressing down on the foot pedal 150 moves the lid mechanism (i.e., one or more rods 162) upwards that pushes on the lid 160 to open. Referring to the example with the one or more rods 162, FIGS. 7 and 10 depict the connection of the foot pedal 150 at the rear to the one or more rods 162. The one or more rods 162 are connected by the hinge 164 wherein the one or more rods 162 pivot upward at the hinge 164 when the foot pedal 150 is pressed downward. The upward motion of the one or more rod 162 pushes the lid 160 open. FIGS. 8 and 10 depict a close-up view of the lid 160 and the halo 170. As best seen in these figures, the one or more rods 162 are connected at a top to the lid 160 by a hinge 165, wherein the connection creates another pivot point. An additional axis, referred to as a lid hinge 166, connecting the lid 160 to the back frame 102*b* allows the lid 160 to pivot open.

As best seen in FIGS. 4, 7, and 8, the one or more rods 162 are connected at the rear to the foot pedal 150 and extend upward to connect to the lid 160 at the hinge 165. The one or more rods 162 extend upward in the hollow space 118 between the inner bin 110 and the back frame 102*b*. Thus, when the inner bin 110 is placed within the frame, the back frame 102*b* and the rim 102*a* abutting the back frame 102*b* are spaced apart from the inner bin 110 to create the hollow space 118. The storage tray 130 and the bin tray 140 inserted in the frame 102 above the base 120 also create the hollow space 118 for the one or more rods 162 to extend upward from the foot pedal 150 in the base 120.

The lid 160 can automatically close once the downward pressure is removed from the foot pedal 150. FIGS. 7 and 10 depict a closing mechanism 180 which slowly closes the lid 160 and prevents the lid 160 from slamming shut. In one or more non-limiting embodiments, the closing mechanism 180 may include a chamber 182, a plunger 184, and a spring 186. The chamber 182 has a cylindrical cup shape, and the plunger 184 and the spring 186 are disposed within the chamber 182. The chamber 182 is configured in the base 120 immediately below the storage tray 130 and above the foot pedal 150. The chamber 182 includes an air hole 182*a* on a side of the chamber 182. The air hole 182*a* allows air to be pushed out and pulled in during the opening and closing of the lid 160.

The plunger 184 disposed within the chamber 182 is connected to the foot pedal 150 and can pivot at two points, a first pivot point 184*a* and a second pivot point 184*b*. The first pivot point 184*a* connects the plunger 184 to the foot pedal 150 by a rod 185 allowing the pivoting motion at the first pivot point 184*a*. The second pivot point 184*b* is above the first pivot point 184*a* and connects the rod 185 to the plunger 184 allowing a pivoting motion at the second pivot point 184*b*. The spring 186 is disposed between the plunger 184 and a top of the base 120. When a downward pressure is placed on the foot pedal 150, the foot pedal 150 pivots at its own pivot point 152 and moves the plunger 184 upward within the chamber 182. The upward movement of the plunger 184 is possible because of the first pivot point 184*a* and the second pivot 184*b*. The plunger pushes the spring 186 against the top of base 120 wherein the spring 186 causes downward pressure on the plunger 184 and the foot pedal 150. As long as the downward pressure is applied on the foot pedal 150 the lid remains open and the plunger 184 remains up in the chamber 182. Also, as the plunger 184 moves upward, air is pushed out from the chamber 182 through the air hole 182*a*. When the downward pressure is removed from the foot pedal 150, a pressure on the spring 186 is released and the spring 186 recoils and provides the initial push to the plunger 184 to move downward causing the lid to start to close. As the lid 160 closes, air is pulled in through the air hole 182*a* at a slow and constant rate which translates to a slow and constant movement of the foot pedal 150 which in turn moves the lid 160 downward at a slow and constant movement to close. In other words, the slow oscillatory movement of the foot pedal 150 moves the one or more rods 162 slowly back to their starting position while pulling down on the lid 160. The plunger 184 prevents air escaping from the sides of the chamber by having one or more rubber O-rings 183 around a circumference of the plunger 186 which push up against the sides of the chamber. In other words, the slow closing of the lid 160 works by having the chamber 182 become pressurized as a downward pressure is applied on the foot pedal 150, and the air is returned slowly as the pressure is removed from the foot pedal 150.

The trash receptacle 100 also comprises the halo lid 170 which is pivotally arranged at a top of the rim 102*a* by a hinge 172. FIGS. 1, 5, 9, and 11 illustrate the halo lid 170. The halo lid 170 is a ring that is configured as having a cross-sectional shape of the trash receptacle 100 and sized to rest on the top edge 112 of the inner bin 110. The halo lid 170 is provided to align a top of a trash bag over the top edge 112 of the inner bin 110 to hold a trash bag in place to prevent the trash bag from slipping into the trash receptacle 100. The halo lid 170 has an overhanging lip 174 on an inner circumference of the halo lid 170, as best seen in a cross-sectional view of a top half of the trash receptacle 100 in FIG. 11. When the halo lid 170 is resting on the top edge 112 of the inner bin 110, the overhanging lip 174 extends downward into an inner cavity of the inner bin 110 to abut against an inner side of the inner bin 110. The overhanging lip 174 also prevents a top of a trash bag from slipping by pressing a portion of the trash bag against the inner bin 110. The halo lid 170 can be opened and closed by a user and the hinge 172 is separate from the lid hinge 166.

Generally, in use, the trash receptacle 100 collects trash in a trash bag lining the inner bin 110. A user steps on the foot pedal 150 to open the lid 160. While stepping on the foot pedal 150 to keep the lid 160 open, the user throws trash into the inner bin 110 lined with a trash bag. To close the lid 160, the user removes the pressure off the foot pedal 150. The lid 160 will close slowly because of the closing mechanism 180 as it reaches the rim 102*a* of the trash receptacle 100. Once the lid 160 is fully closed, the trash receptacle is sealed and prevents odors from escaping.

To replace a trash bag in the trash receptacle 100, a user steps on the foot pedal 150 to open the lid 160. The user then manually lifts the halo lid 170 sealing a top of the trash bag around the top edge 112 of the inner bin 110 until it is fully open. While maintaining the pressure on the foot pedal 150 to keep the lid 160 open, the user grabs the trash bag from around the top edge 112 of the inner bin 110 and pulls up a full bag out of the trash receptacle 100. A top of a replacement trash bag is pulled out from the storage tray 130 through the opening 142 in the bin tray 140. The top of the replacement bag is attached to a bottom of the full bag being replaced. As the user pulls out the full trash bag, the top of the replacement bag is brought up and the user can manually separate the full bag from the replacement bag. The top of the replacement bag is placed over the top edge 112 of the inner bin 110. The halo lid 170 can be lowered down to rest on top edge 112 of the inner bin 110 to secure the trash bag in place and prevent slippage. The overhanging lip 174 on the halo lid 170 further secures the trash bag to the inner side of the inner bin 110. The pressure may then be removed off the foot pedal 150 to close the lid 160 and seal the top of the trash receptacle. Alternatively, each time a trash bag is used to line the inner bin 110, a replacement bag is pulled up through the opening 142 in the bin tray 140 similar to a tissue in a tissue box. In this situation, the user reaches down to the opening 142 to pull up a replacement bag after the full bag has been removed.

To stock the trash receptacle 100 with replacement trash bags, the storage bin 130 is pulled out from the opening 103 in the front of the trash receptacle 100. A trash bag cartridge is placed within the storage bin 130 ensuring that an opening in the trash cartridge is facing up and can align with the opening 142 in the bin tray 140. A trash bag is then pulled through the opening 142 to line the inner bin 110 of the trash receptacle 100.

Advantageously, the present disclosure addresses the unmet need of providing a trash receptacle that comprises of a trash bag storage bin which easily dispenses a replacement trash bag. Advantageously, the trash receptacle also provides an easy means of cleaning the trash receptacle by having an inner bin which has an open end closed by the storage bin and a bin tray which are both removable for easy cleanup in case of spillage. Another advantage being that the trash bags are securely lined within the trash receptacle without overhanging the trash bag over the top end of the trash receptacle.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A trash receptacle, comprising:

a frame defined by a rim and side walls;

an inner bin having an open top and an open bottom, the inner bin housed within the frame;

a base connected to the side walls at an end opposite the rim;

a lid pivotally connected to a top end of the rim;

a halo lid pivotally connected to the top end of the rim;

a storage tray and a bin tray configured to fit on a top of the storage tray, wherein the storage tray and the bin tray are removably inserted within an opening at a front of the trash receptacle above the base, wherein the storage tray can slide in and out of the opening with the bin tray or without the bin tray; and a foot pedal housed in the base, wherein the foot pedal is connected to a lid opening and closing mechanism.

2. The trash receptacle of claim 1, the inner bin having walls that extend downward toward the base, wherein the bottom of the inner bin does not extend downward past the opening at the front of the trash receptacle.

3. The trash receptacle of claim 1, wherein a bottom surface of the storage tray includes one or more grooves, wherein a top surface of the base includes one or more tracks, and wherein the one or more grooves align with the one or more tracks to slide the storage tray on the base through the opening in the front of the trash receptacle.

4. The trash receptacle of claim 1, wherein the bin tray fits between the open bottom of the inner bin and the storage tray, and wherein the bin tray provides a floor for the inner bin.

5. The trash receptacle of claim 4, wherein the bin tray includes an opening for accessing a trash bag in the storage tray and wherein the opening for accessing the trash bag comprises a pliable material with one or more slits.

6. The trash receptacle of claim 5, wherein the bin tray has raised edges and the opening for accessing the trash bag has a raised lip.

7. The trash receptacle of claim 4, wherein the storage tray is configured with a raised lip on each of a left side wall and a right side wall to prevent the bin tray from sliding out of the opening in the trash receptacle until the storage tray is pulled out.

8. The trash receptacle of claim 1, wherein the foot pedal is connected to the base at a pivot point, wherein the foot pedal pivots in an oscillatory motion at the pivot point.

9. The trash receptacle of claim 1, wherein the lid opening and closing mechanism comprises one or more rods connected to the foot pedal and the lid, wherein the one or more rods connect to the foot pedal by a hinge at a rear of the base and extend upward along a hollow space between the inner bin and the frame to connect to an inner surface of the lid by a second hinge, and wherein the downward pressure on the foot pedal pushes the rear of the foot pedal upwards whereby the one or more rods are pushed upward to open the lid and wherein the lid pivots upward at a lid hinge connecting the lid to the rim.

10. The trash receptacle of claim 1, wherein the lid opening and closing mechanism comprises, a chamber having a cylindrical cup shape configured in the base above the foot pedal, the chamber having an air hole on a side;

a plunger disposed within the chamber and connected to the foot pedal by a rod, wherein the plunger pivots at a first pivot point and a second pivot point, the first pivot point connects the rod to the foot pedal, and the second pivot point connects the rod to the plunger; and a spring disposed in the chamber above the plunger.

11. The trash receptacle of claim 10, wherein the plunger has one or more O-rings around a circumference of the plunger.

12. The trash receptacle of claim 11, wherein a downward pressure on the foot pedal moves the plunger and the spring upward in the chamber, wherein the upward movement of the plunger pushes air out of the chamber through the air hole, and wherein releasing the downward pressure on the foot pedal, releases a pressure on the spring whereby the spring recoils pushing the plunger downward toward the foot pedal, wherein the plunger moving downward, moves the foot pedal in the oscillatory movement whereby the one or more rods move downward while pulling the lid closed, wherein the downward movement of the plunger pulls air in through the air hole to slow the downward movement of the plunger whereby the lid closes slowly.

13. The trash receptacle of claim 1, wherein the halo lid is configured as having a cross-sectional shape of the inner bin and sized to rest on a top edge of the inner bin.

14. The trash receptacle of claim 13, wherein the halo lid has an overhanging lip on an inner circumference of the halo lid, wherein the overhanging lip abuts against an inner side of the inner bin when resting on the top edge of the inner bin.

15. A trash receptacle comprising, a frame defining a housing for an inner bin, wherein the inner bin has an open top and an open bottom, whereby the open top is closed by a lid pivotally connected to a top of the frame;

a base housing a foot pedal and a lid closing mechanism, wherein the base connects to the frame on an end opposite the lid;

one or more rods connected to the foot pedal at a rear of the base wherein the one or more rods extend upwards to connect with the lid;

a storage tray having upstanding walls forming a cavity, wherein a top of the storage tray is covered by a bin tray which abuts against the open bottom of the inner bin to close the open bottom and define a floor of the inner bin, wherein the storage tray and the bin tray slidingly fit within an opening in a front of the trash receptacle, wherein the storage tray can slide in and out of the opening with the bin tray or without the bin tray; and wherein a downward pressure on the foot pedal pushes the one or more rods upward, whereby the one or more rods push upward on the lid which pivots open, wherein removing the downward pressure on the foot pedal initiates a downward movement of the lid and engages the lid closing mechanism to close the lid in a slow manner.

16. The trash receptacle of claim 15, the inner bin having walls that extend downward toward the bin tray covering the storage tray within the frame, and wherein the bottom of the inner bin does not extend downward past the opening in the front of the trash receptacle, whereby the storage tray and the bin tray slide into and out of the opening in the front of the trash receptacle unhindered.

17. The trash receptacle of claim 15, wherein a bottom surface of the storage tray includes one or more grooves, wherein a top surface of the base includes one or more tracks, and wherein the one or more grooves align with the one or more tracks to slide the storage tray on the base through the opening in the front of the trash receptacle.

18. The trash receptacle of claim 15, wherein the bin tray has raised edges and an opening with a raised lip, wherein the opening with the raised lip is centrally placed on the bin tray for accessing a trash bag in the storage tray and wherein the opening with the raised lip comprises a pliable material with one or more slits.

19. The trash receptacle of claim 15, wherein the foot pedal is connected to the base at a pivot point, wherein the foot pedal pivots in an oscillatory motion at the pivot point.

20. The trash receptacle of claim 15, wherein the lid closing mechanism comprises, a chamber having a cylindrical cup shape configured in the base above the foot pedal, the chamber having an air hole on a side;

a plunger disposed within the chamber and connected to the foot pedal by a rod, wherein the plunger pivots at a first pivot point and a second pivot point, the first pivot connects the rod to the foot pedal, and the second pivot point connects the rod to the plunger; and a spring disposed in the chamber above the plunger.

21. The trash receptacle of claim 20, wherein the downward pressure on the foot pedal moves the plunger and the spring upward in the chamber, wherein the upward movement of the plunger pushes air out of the chamber through the air hole, and wherein releasing the downward pressure on the foot pedal, releases a pressure on the spring whereby the spring recoils pushing the plunger downward toward the foot pedal, wherein the plunger moving downward moves the foot pedal in the oscillatory movement whereby the one or more rods move downward while pulling the lid closed, wherein the downward movement of the plunger pulls air in through the air hole to slow the downward movement of the plunger whereby the lid closes slowly.

22. The trash receptacle of claim 20, wherein the plunger has one or more O-rings around a circumference of the plunger.

23. The trash receptacle of claim 15, further comprising a halo lid pivotally connected to the top of the frame, wherein the halo lid is configured as having a cross-sectional shape of the inner bin and sized to rest on a top edge of the inner bin.

24. The trash receptacle of claim 23, wherein the halo lid is configured with an overhanging lip on an inner circumference of the halo lid, wherein the overhanging lip abuts against an inner side of the inner bin when resting on the top edge of the inner bin.

* * * * *